United States Patent
Andre et al.

(10) Patent No.: US 12,162,344 B2
(45) Date of Patent: Dec. 10, 2024

(54) DEVICE FOR ADJUSTING AN AIR STREAM FOR AN AIR INLET OF A MOTOR VEHICLE

(71) Applicant: Valeo Systemes Thermiques, Le Mesnil Saint-Denis (FR)

(72) Inventors: Stephan Andre, Le Mesnil Saint Denis (FR); Emmanuel Henon, Le Mesnil Saint Denis (FR); Jerome Ripa, Le Mesnil Saint Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 265 days.

(21) Appl. No.: 17/621,838

(22) PCT Filed: Jun. 15, 2020

(86) PCT No.: PCT/FR2020/051022
§ 371 (c)(1),
(2) Date: Dec. 22, 2021

(87) PCT Pub. No.: WO2020/260793
PCT Pub. Date: Dec. 30, 2020

(65) Prior Publication Data
US 2022/0402353 A1  Dec. 22, 2022

(30) Foreign Application Priority Data
Jun. 26, 2019 (FR) ........................... 1906943

(51) Int. Cl.
*B60K 11/08* (2006.01)
*B60K 11/04* (2006.01)
(Continued)

(52) U.S. Cl.
CPC ............ *B60K 11/085* (2013.01); *B60K 11/04* (2013.01); *F01P 1/00* (2013.01); *F01P 3/18* (2013.01); *F01P 2001/005* (2013.01)

(58) Field of Classification Search
CPC .......... B60K 11/085; B60K 11/04; F01P 1/00; F01P 3/18; F01P 2001/005
(Continued)

(56) References Cited

U.S. PATENT DOCUMENTS

| | | | |
|---|---|---|---|
| 2004/0007346 A1 | 1/2004 | Branham et al. | |
| 2005/0279548 A1* | 12/2005 | Kurtz | B60K 11/04 180/68.6 |
| 2013/0059519 A1* | 3/2013 | Tajima | B60K 11/04 454/152 |

FOREIGN PATENT DOCUMENTS

| | | |
|---|---|---|
| CN | 102717698 A | 10/2012 |
| CN | 202965935 U | 6/2013 |

(Continued)

OTHER PUBLICATIONS

FI 111146 B (Wagner et al.) (Jun. 13, 2003) (Machine Translation) (Year: 2003).*
(Continued)

*Primary Examiner* — Mahmoud Gimie
(74) *Attorney, Agent, or Firm* — Osha Bergman Watanabe & Burton LLP

(57) ABSTRACT

The invention relates to a device for adjusting (80) an air stream for an air inlet of a motor vehicle, comprising a housing (81) defining a flow duct (82) into which an air stream flows and in which a cooling unit comprising at least one heat exchanger (83) is at least partially arranged, the housing comprising a flap (85) designed to be placed in an open position providing access to the heat exchanger, said flap being designed to close the access in the closed position, said access (86) being designed in particular to enable removal of the heat exchanger through a substantially translational movement.

9 Claims, 3 Drawing Sheets

Figure 1:
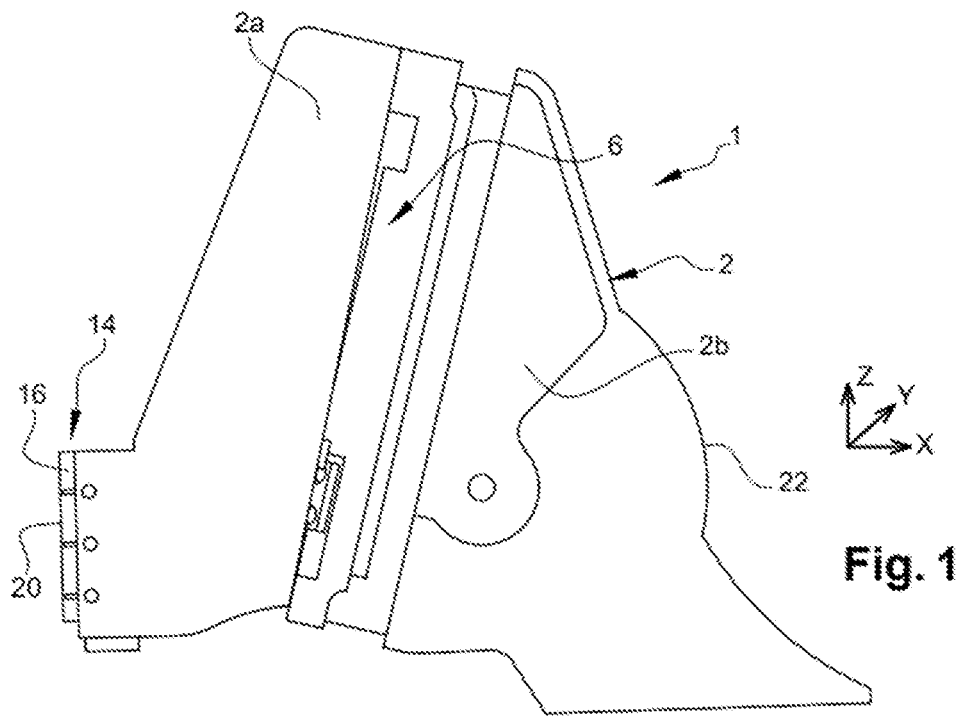

(51) Int. Cl.
*F01P 1/00* (2006.01)
*F01P 3/18* (2006.01)

(58) Field of Classification Search
USPC ........................................................ 180/68.1
See application file for complete search history.

(56) References Cited

FOREIGN PATENT DOCUMENTS

| CN | 104085290 | A | | 10/2014 | | |
|----|-----------|---|---|---------|---|---|
| CN | 108025622 | A | * | 5/2018 | ......... | B60H 1/00064 |
| DE | 2140870 | A1 | | 4/1973 | | |
| DE | 3916692 | A1 | * | 11/1990 | ........... | B62D 35/001 |
| DE | 19506475 | A1 | * | 9/1995 | ............. | B60K 11/02 |
| DE | 19831256 | A1 | | 1/2000 | | |
| EP | 0714797 | A1 | | 6/1996 | | |
| ES | 2275979 | T3 | * | 6/2007 | ......... | B60H 1/00507 |
| FI | 111146 | B | * | 6/2003 | ......... | B60H 1/00378 |
| JP | H10-081123 | A | | 3/1998 | | |
| JP | 2001-074349 | A | | 3/2001 | | |
| JP | 2002-067707 | A | | 3/2002 | | |
| SE | 536508 | C2 | * | 1/2014 | ............. | B60K 11/04 |
| WO | WO-2019002287 | A1 | * | 1/2019 | ............. | B60K 11/04 |

OTHER PUBLICATIONS

WO-2019002287-A1 (Herlem et al.) (Mar. 1, 2019) (Year: 2019).*
International Search Report with Written Opinion in corresponding International Application No. PCT/FR2020/051022, mailed Oct. 29, 2020 (9 pages).
Notification of Reason for Rejection in corresponding Japanese Application No. 2021-577130, dated Jan. 6, 2023 (11 pages).
Japanese Office Action issued in Japanese Application No. 2021-577130 mailed on Jun. 27, 2023 (10 pages).
Office Action issued in counterpart Chinese Application No. 202080042841.2, dated Nov. 7, 2023 (11 pages).
Office Action issued in counterpart Chinese Patent Application No. 202080042841.2 mailed May 30, 2024 (15 pages).

* cited by examiner

DEVICE FOR ADJUSTING AN AIR STREAM FOR AN AIR INLET OF A MOTOR VEHICLE

The present invention relates to a device for regulating an air stream for an air inlet of a motor vehicle.

Generally, a motor vehicle comprises an air inlet that takes the form of an opening situated on the front face of said motor vehicle. The incoming air is used to enable a heat exchange between it and the cooling system of the motor vehicle, said cooling system being situated near the front face of said vehicle. More specifically, the air that enters the engine compartment of the motor vehicle is guided to the cooling system of said motor vehicle to enable a heat exchange between the incoming air and the heat exchanger of the cooling system. It is important to minimize the losses of the air stream between the air inlet and the heat exchanger. Specifically, any air stream entering the inside of the vehicle, and escaping to the engine compartment before it has contributed to the heat exchange inside the motor vehicle, has a negative influence on the air resistance coefficient of said motor vehicle.

It is known practice to use air guides that take the form of a housing generally made from plastic or another flexible material connecting the air inlet to the cooling system.

In the context of an electric vehicle, the air inlet regulation device can comprise an air duct arranged downstream of the cooling system and designed to guide the air stream to the outside of the vehicle. Such a duct can be advantageous for generating a Venturi effect downstream of the cooling unit so that a greater air flow rate can pass through the cooling system, thus improving the thermal efficiency.

The aim of the invention is in particular to make it easier to access the heat exchangers in this type of device, in particular if there is a need for repair or replacement of components.

Therefore, a subject of the present invention is a device for regulating an air stream for an air inlet of a motor vehicle, comprising a housing defining a flow duct in which there can flow an air stream, in which a cooling unit comprising at least one heat exchanger and in particular a motor-fan unit is at least partially arranged, the housing having a hatch arranged so as to be placed in an open position freeing up an access to the heat exchanger, this hatch being arranged so as to close this access in the closed position, this access being in particular arranged so as to allow removal of the heat exchanger via a substantially translational movement.

The invention thus makes it possible to access the heat exchanger without having to dismantle the entire air regulation device, or even the entire front face of the vehicle. In addition, the invention can make it possible to remove the heat exchanger via a translational movement, and this makes it possible to preserve the sealing beads around the heat exchangers.

In addition, the invention can make it possible to open the housing following a translational movement at the start, and this makes it possible to preserve the sealing beads around the heat exchangers.

According to one of the aspects of the invention, the hatch is connected to a fixed wall of the housing by an articulation arranged so as to allow the hatch to pivot between the closed position and the open position, this hinge in particular extending along a line that is at a non-zero distance from two parallel edges of the housing. The access, or opening, is in particular of substantially rectangular shape.

According to one of the aspects of the invention, the articulation has at least one hinge, in particular produced in one piece with at least one of the fixed wall and the hatch, in particular both at the same time.

According to one of the aspects of the invention, the hatch is connected to the fixed wall by at least two hinges, in particular by two identical hinges that are parallel to each other.

According to one of the aspects of the invention, the articulation between the hatch and the fixed wall has one or more hinge pins.

According to one of the aspects of the invention, the hatch extends over a surface area at least 1.5 or 2 times greater than the surface area of the fixed wall, which fixed wall is in particular substantially flat and adjacent to the hatch.

According to one of the aspects of the invention, the hatch has a main face and two lateral walls that face each other, these lateral walls in particular having a substantially triangular shape, this main wall being in particular in two parts that are connected to each other.

According to one of the aspects of the invention, the hatch is formed on an upstream part of the housing, the upstream part being placed upstream of the heat exchanger, this upstream part in particular extending between an air inlet and the heat exchanger, the hatch being in particular, in the closed position, in sealed contact with a frame.

According to one of the aspects of the invention, the housing has two half-housings, which together form said flow duct, a means being arranged between each half-housing and a frame or between these half-housings.

A further subject of the invention is a method for removing a heat exchanger from a device, said method involving the step of putting the hatch in the open position, thereby freeing up the access to the heat exchanger, and then the step of removing, through said access, this heat exchanger, in particular via a substantially translational movement.

Figure 2:
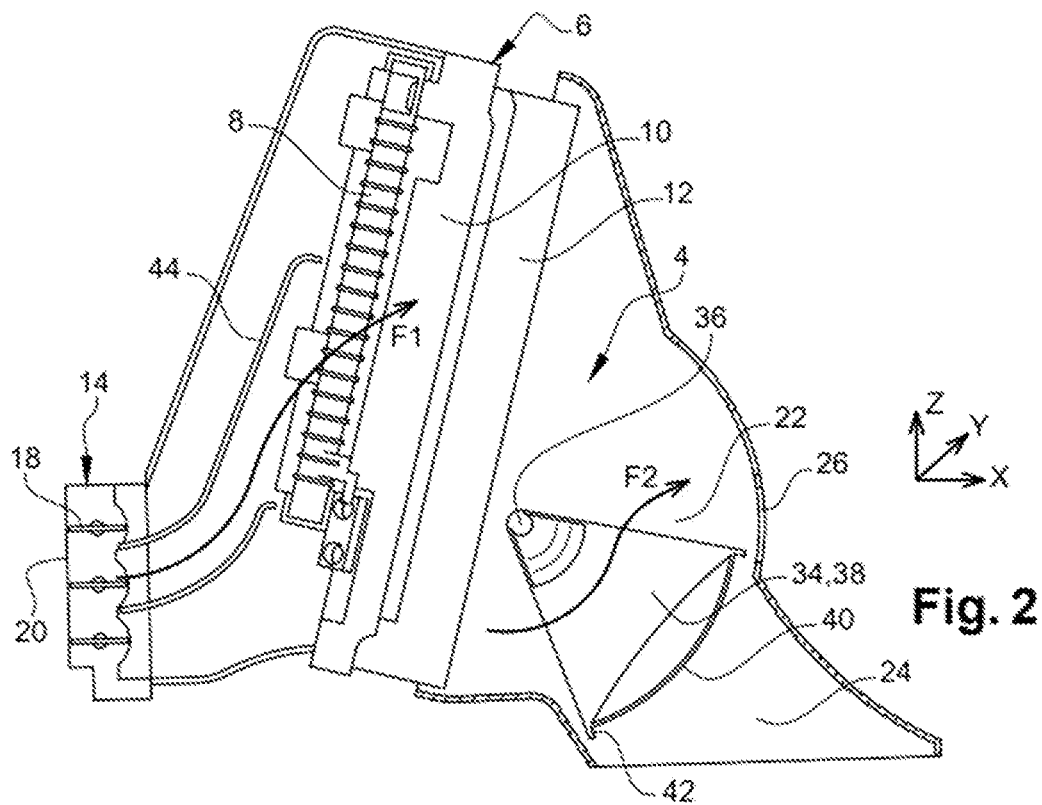
Figure 3:
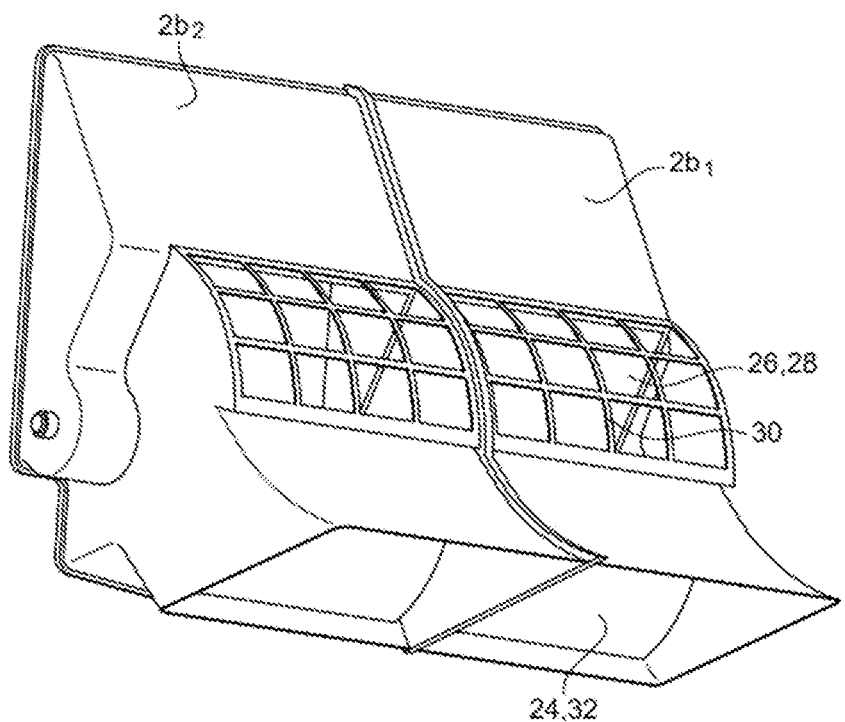
Figure 4:
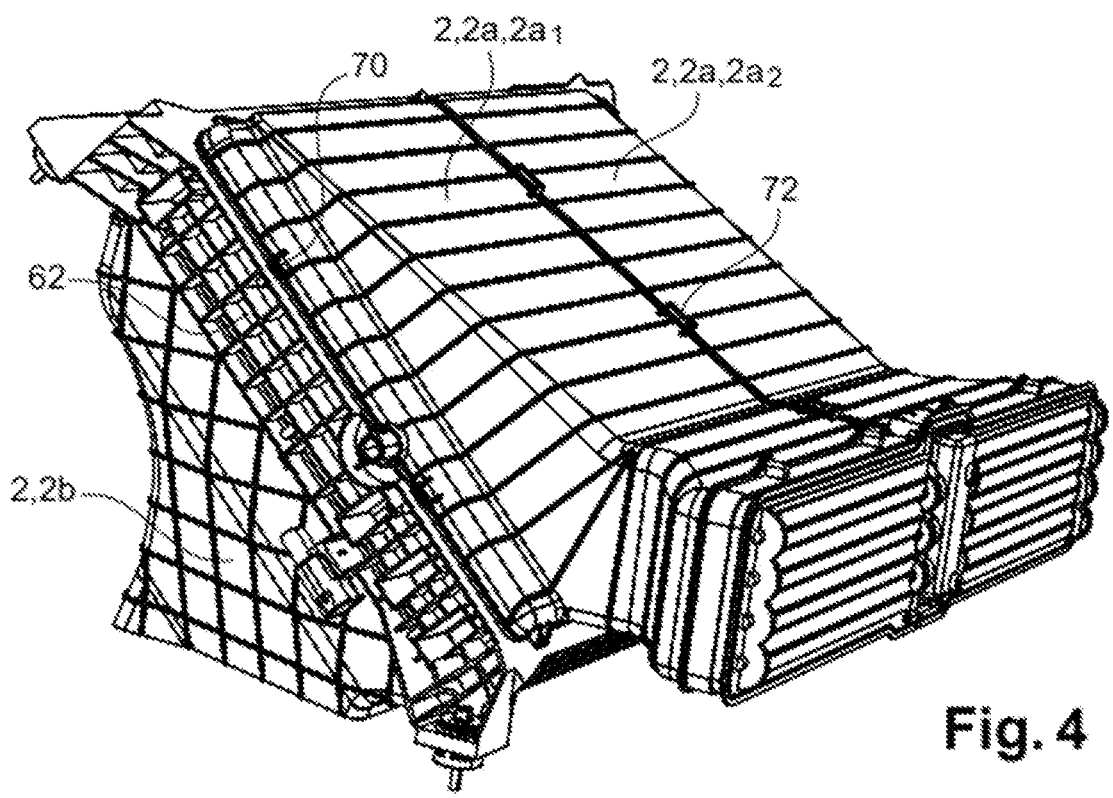
Figure 5:
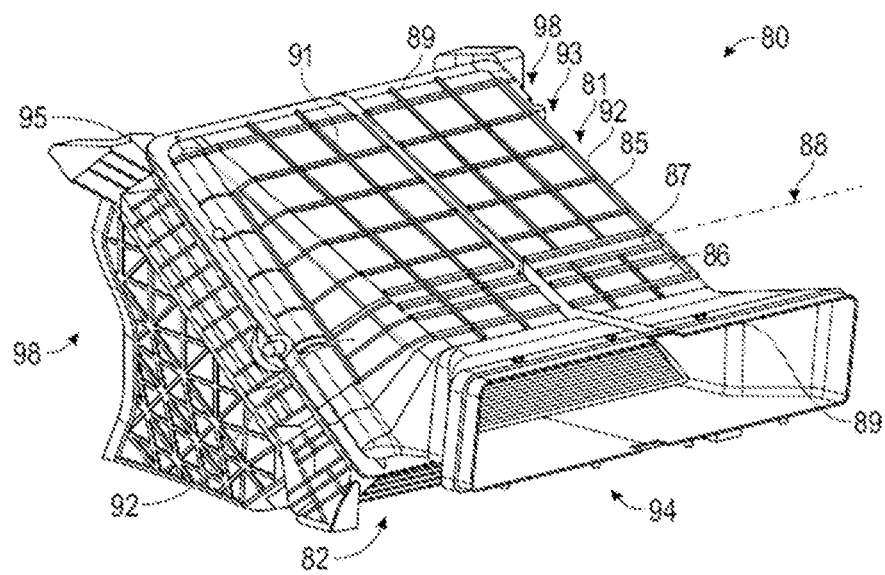
Figure 6:
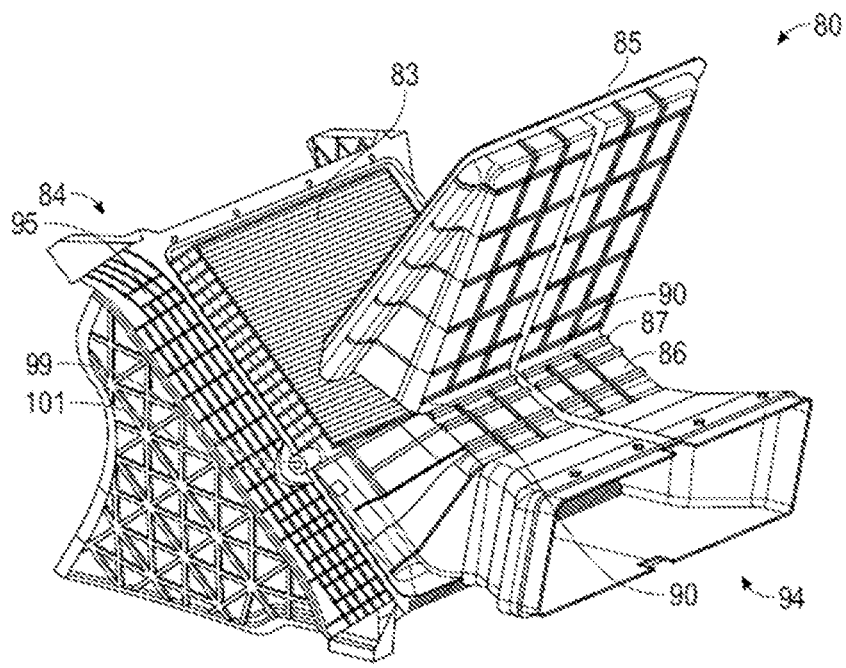

Further characteristics, details and advantages of the invention will become more clearly apparent upon reading the detailed description given below, and several exemplary embodiments that are given by way of nonlimiting indication, with reference to the attached schematic drawings, in which:

FIG. 1 shows a profile view of a device for regulating an air stream according to the invention, FIG. 2 shows a cross section of the device for regulating an air stream in [FIG. 1], FIG. 3 shows a perspective view of part of the device for regulating an air stream in [FIG. 1], FIG. 4 shows a perspective view of the regulation device according to the invention, FIG. 5 shows a perspective view of the regulation device according to another example of the invention, FIG. 6 shows this regulation device with the hatch in the open position.

FIG. 1 shows the device 1 for regulating an air stream for an air inlet of a motor vehicle according to the invention. The regulation device 1 extends in a longitudinal (X), transverse (Y) and vertical (Z) direction, for example relative to the axes of the vehicle, as shown by the axes in FIGS. 1 and 2.

According to the present invention, the terms "downstream", "upstream", "in series" and "parallel" qualify the position of one component with respect to another, in the direction of flow of a stream of air in a device 1 for regulating an air stream according to the present invention.

The device 1 for regulating an air stream according to the invention comprises a housing 2 corresponding to a shell or else to a sleeve, thus, via its walls, defining a flow duct 4 with an air inlet 20 and an air outlet 22 and in which an air stream flows. The housing 2 is made from a flexible material in order to absorb the vibrations of the vehicle when it is traveling, and from a material strong enough to hold elements such as heat exchangers; certain plastics, for example polypropylene or polyamide-6, lend themselves to such use.

The device 1 for regulating an air stream according to the invention further comprises a cooling unit 6. The cooling unit 6 comprises at least one heat exchanger intended to allow a heat exchange between the air stream and the fluid circulating within the heat exchanger. As shown in FIG. 2, the cooling unit 6 in this case comprises a first and a second heat exchanger 8, 10. The first heat exchanger 8 corresponds for example to a condenser, while the second heat exchanger 10 corresponds for example to a radiator. The cooling unit 6 further comprises a motor-fan unit 12 corresponding to a fan with blades and an associated motor so that it can take in and discharge an air stream through the regulation device 1, even when the vehicle is stationary. The cooling unit 6 also comprises a supporting frame 62, visible in FIG. 4, corresponding to a rigid structure, more specifically to a rigid plastic frame with four members delimiting a surface within which the heat exchangers 8, 10 and said motor-fan unit 12 are arranged. In order to ensure the continuity of the flow duct 4, the housing 2 is fastened to the supporting frame 62 in a sealed manner. In other words, the supporting frame 62 ensures the continuity of the flow duct 4 or, in other words, the supporting frame 62 corresponds to part of the flow duct 4.

The device 1 for regulating an air stream according to the invention further comprises a shut-off device 14 comprising a set of shut-off flaps 18 capable of pivoting in rotation so that they vary the flow rate of the air stream, said shut-off device 14 being arranged in the flow duct 4 upstream of the cooling unit 6 relative to the flow of the air stream. The shut-off device 14 further comprises a support frame 16 having bearings so as to hold the shut-off flaps 18.

Each shut-off flap 18 comprises an axis of rotation embodied by a journal that is inserted into the bearings of the support frame 16. The axes of rotation allow the shut-off flaps 18 to switch from an open configuration to a closed configuration. The open configuration, or in other words opening a shut-off flap 18, consists of placing (by rotation) the shut-off flaps 18 so that they provide as little opposition as possible to the passage of the air stream while orienting it appropriately. As shown in FIG. 2, in the open configuration, the shut-off flaps 18 are arranged in a horizontal position, in other words they extend in a longitudinal (X) and transverse (Y) direction, and thus ensure a maximum flow rate of the air stream, the air inlet 20 being clear. The closed configuration, or in other words closing a shut-off flap 18, consists of placing the shut-off flaps 18 so that they provide, by means of their front surface, as much opposition as possible to the flow of the air stream F, in conjunction with the other shut-off flaps 18. In this configuration, the shut-off flaps 18 are arranged in a vertical position, in other words they extend in a transverse (Y) and vertical (Z) direction, and thus ensure a minimum or even zero flow rate of the air stream, the air inlet 20 being shut off. Of course, the shut-off flaps 18 are capable of adopting any intermediate position between these two configurations.

The housing 2 according to the invention, and as illustrated in FIGS. 1 and 4, is made in two parts, a first part 2a connecting the inlet of the housing 2, and therefore the air inlet 20 of the flow duct 4, in which the shut-off device 14 is arranged, to the cooling unit 6, in particular to the supporting frame 62, and a second part 2b connecting the cooling unit 6 and, more specifically, the supporting frame 62, to the outlet of the housing 2 and therefore to the air outlet 22 of the flow duct 4. The parts 2a, 2b of the housing comprise fastening means 70 such as clips, hooks, screws with threaded shanks/nuts with tapped holes, bolts, etc. of shapes that complement the fastening means 70 arranged on the supporting frame 62. It will therefore be appreciated that the supporting frame 62 ensures the continuity of the flow duct 4 between the two parts 2a, 2b of the housing 2.

According to other embodiments, the parts 2a, 2b can also comprise fastening means with complementary shapes so that each part 2a, 2b can be fastened to the other. A housing 2 in a single one-piece part forming continuity of material between the air inlet 20 and the air outlet 22 of the flow duct 4 can also be envisaged.

The housing 2, and more specifically each part 2a, 2b according to the invention and as illustrated in FIGS. 3 and 4, may comprise two half-housings 2a1, 2a2, 2b1, 2b2. Each pair of half-housings 2a1, 2a2, or 2b1, 2b2, together form part of the flow duct 4. In other words, the first pair of half-housings 2a1, 2a2 as illustrated in FIG. 4 constitutes the part 2a of the housing 2, namely the part of the flow duct 4 that connects the inlet of the housing 2, in particular the air inlet 20 of the flow duct 4, in which the shut-off device 14 is arranged, to the cooling unit 6, in particular to the supporting frame 62. The second pair of half-housings 2b1, 2b2, illustrated in FIG. 3, constitutes the second part 2b, namely the part of the flow duct 4 that connects the cooling unit 6, and more specifically the supporting frame 62, to the outlet of the housing 2 and therefore to the air outlet 22 of the flow duct 4. Each pair of half-housings 2a1, 2a2, or 2b1, 2b2 comprises fastening means 72 of complementary shapes, such as clips, in which the female part is arranged on one half-housing 2a1 and the male part is arranged on the corresponding other half-housing 2a2, or vice versa. These fastening means 72 may be reversible so that the half-housings 2a1, 2a2, 2b1, 2b2 are fastened to one another removably, or in other words so that the half-housings 2a1, 2a2, 2b1, 2b2 can be taken apart by a reversible connection.

FIG. 5 shows a device 80 for regulating an air stream according to another exemplary embodiment of the invention.

This device 80 is substantially analogous to the device described above, and comprises a housing 81 defining a flow duct 82 in which there can flow an air stream, in which a cooling unit comprising a heat exchanger 83 is arranged, the housing having a hatch 85 arranged so as to be placed in an open position, as illustrated in FIG. 6, freeing up an access 84 to the heat exchanger, this hatch 85 being arranged so as to close this access 84 in the closed position (FIG. 5), this access 84 being in particular arranged so as to allow removal of the heat exchanger 83 via a substantially translational movement.

The hatch 85 is connected to a fixed wall 86 of the housing by an articulation 87 arranged so as to allow the hatch 85 to pivot between the closed position and the open position. This articulation 87 extends along a line 88 that is at a non-zero distance from two parallel edges 89 of the housing. The access 84, or opening, is in particular of substantially rectangular shape. The translational direction of removal of the exchanger 83 is substantially perpendicular to the articulation line 88.

The articulation 87 has two identical hinges 90, produced in one piece with the fixed wall 86 and the hatch 85.

In a variant that has not been illustrated, the articulation between the hatch and the fixed wall has one or more hinge pins.

The hatch 85 extends over a surface area at least 1.5 or 2 times greater than the surface area of the fixed wall, which fixed wall is in particular substantially flat and adjacent to the hatch.

The hatch 85 has a main face 91 and two lateral walls 92 that face each other, these lateral walls in particular having a substantially triangular shape, this main wall being in two parts that are connected to each other.

The hatch 85 is formed on an upstream part 93 of the housing, the upstream part being placed upstream of the heat exchanger, this upstream part 93 in particular extending between an air inlet 94 and the heat exchanger 83, the hatch being, in the closed position, in sealed contact with a frame 95 that envelops the heat exchanger over a certain height.

A fluidic connection 99 for the heat exchanger is present in a cutout 101 on the frame 95.

The hatch 85, the hinges and the fixed wall are made for example of plastic material, for example by molding.

The frame 95 has reinforcing ribs.

The housing has two half-housings 98, which together form said flow duct and are made of plastic or thermoplastic, a means being arranged between each half-housing and a frame 95 or between these half-housings.

The invention claimed is:

1. A device for regulating an air stream for an air inlet of a motor vehicle, comprising:
    a housing defining a flow duct in which there flows an air stream, in which a cooling unit comprising at least one heat exchanger is at least partially arranged,
    the housing having a hatch arranged so as to be placed in an open position freeing up an access to the heat exchanger, the hatch being arranged so as to close the access in the closed position, wherein the hatch has a main face and two lateral walls that face each other, these lateral walls having a substantially triangular shape, the main wall being in two parts that are connected to each other, and
    the access being arranged so as to allow removal of the heat exchanger via a substantially translational movement.

2. The device as claimed in claim 1, wherein the hatch is connected to a fixed wall of the housing by an articulation arranged so as to allow the hatch to pivot between the closed position and the open position, a hinge extending along a line that is at a non-zero distance from two parallel edges of the housing.

3. The device as claimed in claim 2, wherein the articulation has at least one hinge produced in one piece with at least one of the fixed wall and the hatch.

4. The device as claimed in claim 3, wherein the hatch is connected to the fixed wall by at least two hinges by two identical hinges that are parallel to each other.

5. The device as claimed in claim 2, in which the articulation between the hatch and the fixed wall has one or more hinge pins.

6. The device as claimed in claim 1, wherein the hatch extends over a surface area at least 1.5 or 2 times greater than the surface area of the fixed wall, wherein the fixed wall is substantially flat and adjacent to the hatch.

7. The device as claimed in claim 1, wherein the hatch is formed on an upstream part of the housing, the upstream part being placed upstream of the heat exchanger, this upstream part extending between an air inlet and the heat exchanger, the hatch being in the closed position, in sealed contact with a frame.

8. The regulating device as claimed in claim 1, wherein the housing has two half-housings, which together form said flow duct, a means being arranged between each half-housing and a frame or between these half-housings.

9. A method for removing a heat exchanger from a device as claimed in claim 1, said method comprising:
    putting the hatch in the open position, thereby freeing up the access to the heat exchanger; and
    removing, through said access, this heat exchanger, in particular via a substantially translational movement.

* * * * *